United States Patent [19]

Steffen

[11] 4,045,880
[45] Sept. 6, 1977

[54] SOLAR GRAIN DRYING APPARATUS

[76] Inventor: Sylvester L. Steffen, R.R. 3, New Hampton, Iowa 50659

[21] Appl. No.: 676,125

[22] Filed: Apr. 12, 1976

[51] Int. Cl.² .......................... F26B 19/00; F24J 3/02
[52] U.S. Cl. ...................................... 34/93; 126/270
[58] Field of Search .............. 126/270, 271; 237/1 A; 34/93

[56] References Cited

U.S. PATENT DOCUMENTS

| 2,529,621 | 11/1950 | Mayo | 34/93 |
|---|---|---|---|
| 2,688,476 | 9/1954 | Mayo | 34/93 |
| 3,231,986 | 2/1966 | Touton | 34/93 |
| 3,866,334 | 2/1975 | Huang | 34/93 |
| 3,894,345 | 7/1975 | Zeltmann | 126/270 |

FOREIGN PATENT DOCUMENTS

| 240,600 | 9/1962 | United Kingdom | 126/270 |

OTHER PUBLICATIONS

"Drying Crop with Solar Energy", Agricultural Research, vol. 8, May 1960, p. 14.

Primary Examiner—Kenneth W. Sprague
Assistant Examiner—James C. Yeung
Attorney, Agent, or Firm—Henderson, Strom and Sturm

[57] ABSTRACT

A grain storage bin utilizing solar energy to heat air that is circulated through stored grain, having an outside sidewall constructed of heat absorbing material and forming a closed structure. A roof is disposed over the outside sidewalls. An inside sidewall forming a second closed structure is disposed inwardly from the outside sidewall, thereby forming a solar plenum between the outside and inside sidewalls. Air intakes are disposed within the outside sidewalls, thereby permitting ambient air to pass into the solar plenum. An air pervious floor is attached to the inside surface of the inside sidewalls and a grain chamber is formed by the inside sidewalls and the air pervious floor. An air circulating device is disposed within the grain bin for circulating ambient air through the air intakes, the solar plenum, the air pervious floor, the stored grain, and out of the grain bin.

1 Claim, 10 Drawing Figures

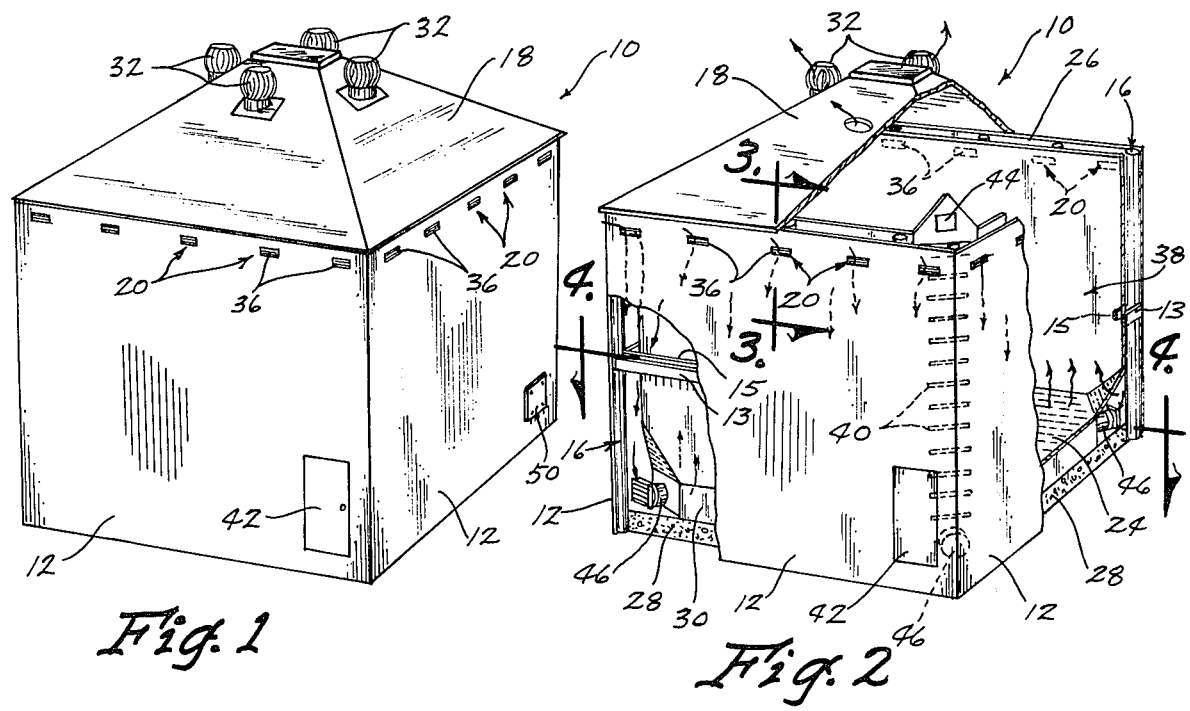
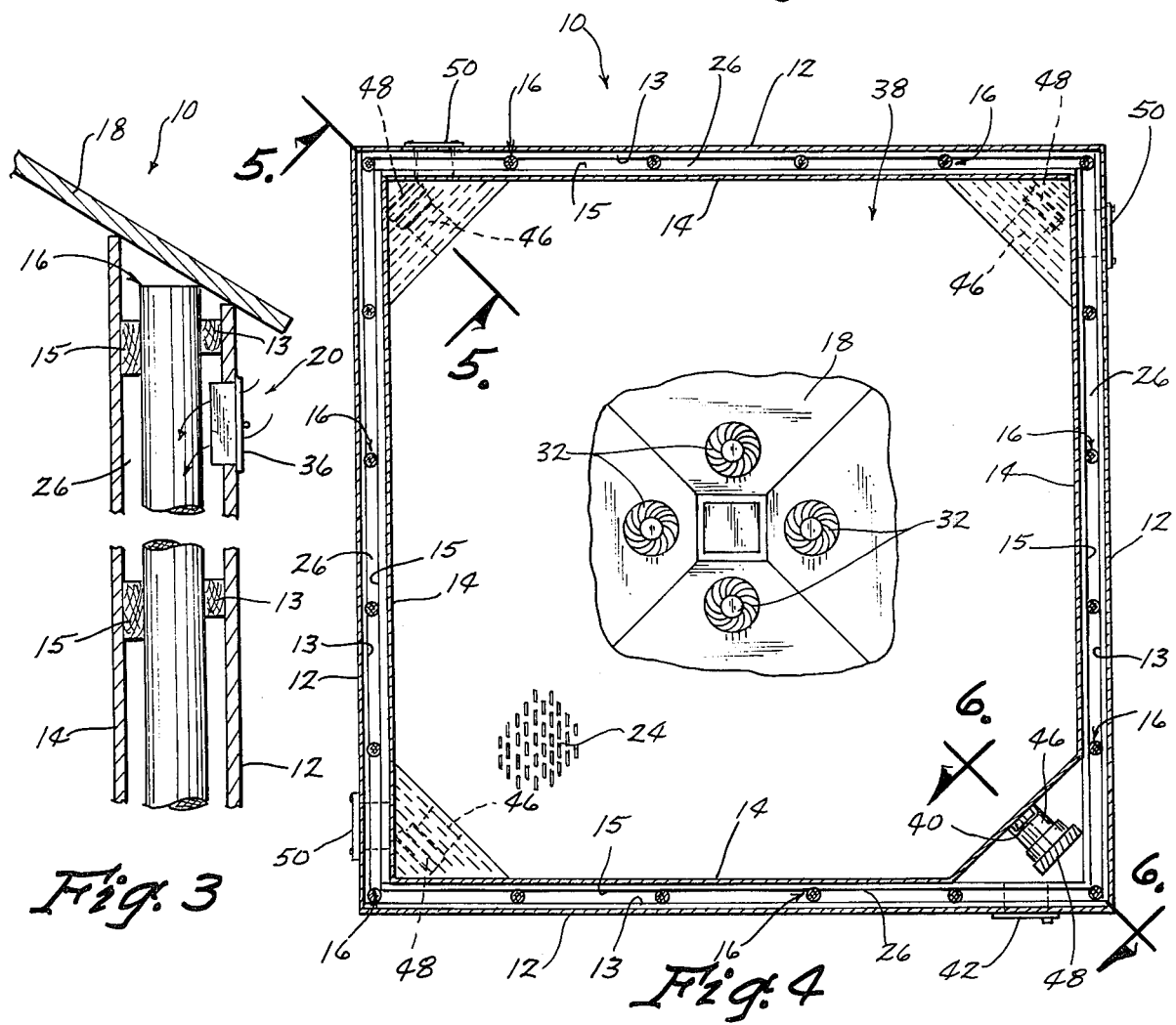

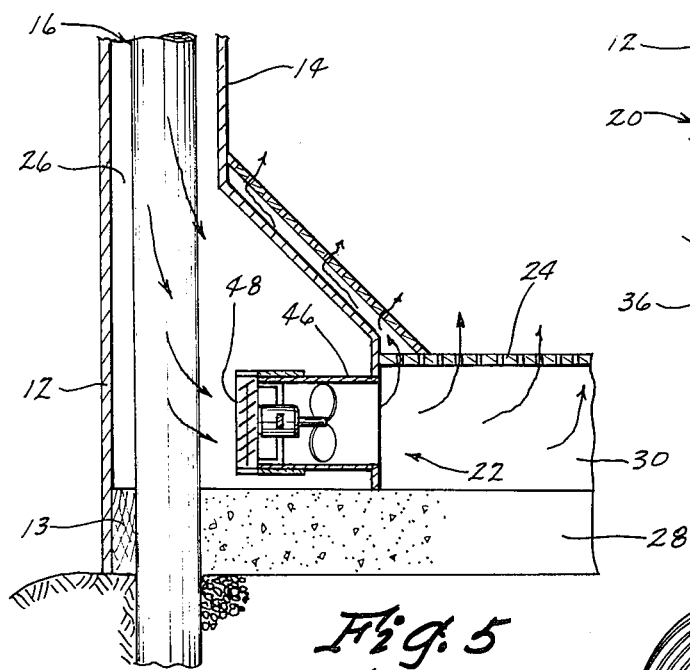
Fig. 5
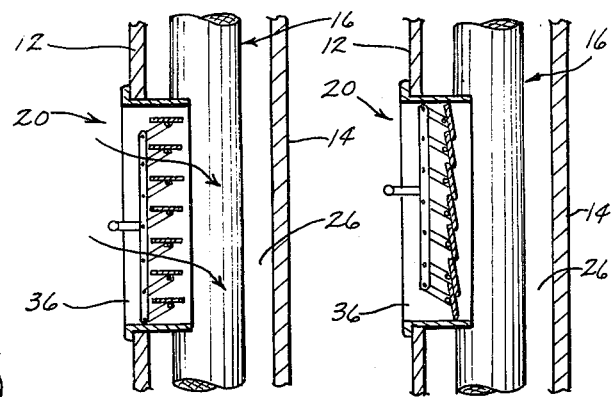
Fig. 7   Fig. 8
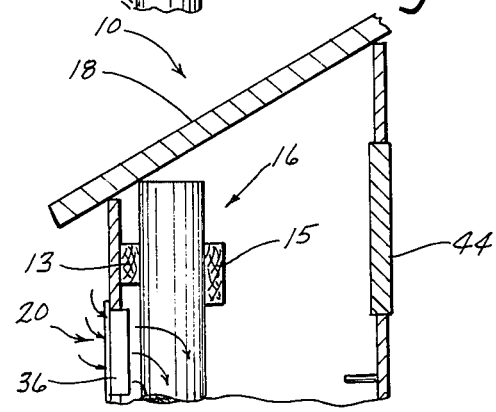
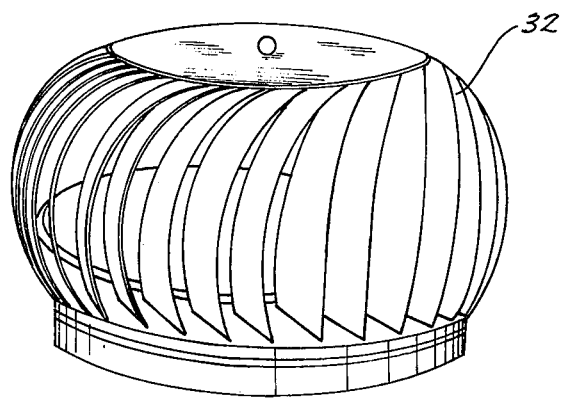
Fig. 9
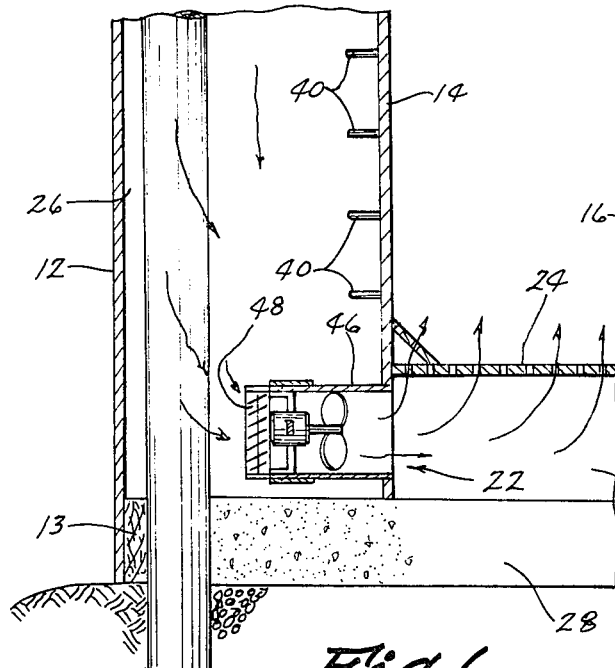
Fig. 6
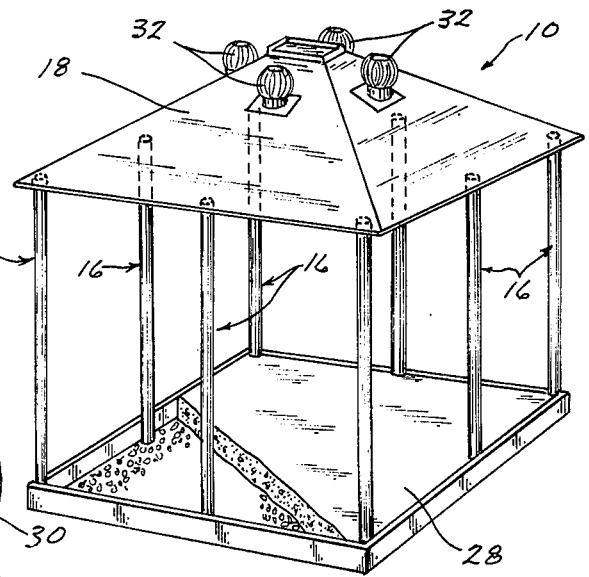
Fig. 10

SOLAR GRAIN DRYING APPARATUS

BACKGROUND OF THE INVENTION

The present invention relates generally to grain drying structures and more particularly to a grain drying structure utilizing solar energy.

With the change in harvesting, that is, from ear-corn to shelled corn, a corresponding change in types of storage structures has occured. The wooden corn crib for ear corn has virtually disappeared in favor of the round, steel bin for shelled corn. Furthermore, with the advent of heated air drying, excess moisture conditions, precipitated by heated air and use of open flames, completely eliminated the practicality of wooden structures.

By understanding natural curing and applying it in a controlled method, wherein drying becomes a chill-curing process eliminating use of open flames, saturated moisture conditions that occur with heated air are not present so that it becomes feasible to reconsider usage of wooden structures. The well known insulating qualities of wood are beneficial in keeping a more stable temperature in grain. The renewable resource of wood is also important in light of the non-renewing resources of iron and zinc used in metal bins. Woodworking tools and wood building contractors are more commonly available, and the art of wood construction is less specialized and generally less expensive than the art of steel construction.

Further, there is a need for grain drying equipment utilizing all the advantages of wood adapted to be used in combination with solar heat as the source of energy.

SUMMARY OF THE INVENTION

The present invention is a grain bin having outside sidewalls constructed of heat absorbing material and forming a closed structure. A roof is disposed on top of the closed structure. Inside sidewalls, forming a second closed structure, are disposed inwardly from the outside sidewalls; thereby forming a solar plenum between the outside sidewalls and the inside sidewalls. Air intakes are disposed within the outside sidewalls for permitting ambient air to pass into the solar plenum. An air pervious floor is attached to the inside surface of the inside sidewalls near the bottom. A grain storage chamber is formed by the inside sidewalls and the air pervious floor. Air circulating devices are disposed within the grain bin for circulating ambient air through the air intakes into the solar plenum, through the air pervious floor, through the grain stored in the grain storage chamber, and out of the grain bin.

An object of the present invention is the provision of a grain bin utilizing solar energy to heat air for drying stored grain.

Another object is to provide a grain bin utilizing primarily wood construction.

A further object of the invention is the provision of a grain bin having a solar plenum between an outside wall and an inside wall.

Still another object is to provide air inlet devices disposed within the outside sidewall for permitting ambient air to flow into the solar plenum.

A still further object is to provide air circulating devices within the grain bin for causing a flow of ambient air through an air intake, through a solar plenum, through an air pervious floor, through the grain, and out of the grain bin.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of the grain bin of this invention;

FIG. 2 is a perspective view of this invention with portions cut away to show some inner parts thereof;

FIG. 3 is taken along line 3—3 of FIG. 2;

FIG. 4 is taken along line 4—4 of FIG. 2;

FIG. 5 is taken along line 5—5 of FIG. 4;

FIG. 6 is taken along line 6—6 of FIG. 4;

FIG. 7 illustrates air vents in an open position for permitting ambient air to enter the solar air plenum;

FIG. 8 illustrates the air vents of FIG. 7 in a closed position thereby preventing ambient air from entering the solar air plenum;

FIG. 9 is a perspective view of an air ventilating device to be mounted on the roof of the grain bin for circulating air through the bin; and FIG. 10 is a perspective cross-sectional view of the grain bin utilizing pole building construction.

DESCRIPTION OF THE PREFERRED EMBODIMENT

Referring now to the drawings wherein like reference numerals designate identical or corresponding parts throughout the several views, the preferred embodiment of the grain bin 10 of this invention is illustrated in FIG. 1.

In general, the grain bin 10 includes an outside sidewall 12 (FIGS. 1–4 and 10) and an inside sidewall 14. The outside sidewall 12 is secured to outside spacer 13 which is secured to and disposed outwardly from and perpendicular to upright supporting elements 16. The inside sidewall 14 is secured to inside spacer 15 which is secured to and disposed inwardly from and perpendicular to upright supporting elements 16. The thickness of the outside spacer 13 and inside spacer 15 determines the distances which the outside sidewall 12 and inside sidewall 14 is spaced from the upright supporting elements 16, as most clearly shown in FIG. 3. A roof 18 overlies the outside sidewall 12 and inside sidewall 14. Further, air intakes 20 are disposed within the outside wall 12 and air circulating devices 22 are disposed over openings 17 in the roof 18, and beneath an air pervious floor 24.

Specifically, the outside sidewall 12 is formed from heat absorbing material so that as the sun shines on the outside sidewall 12, the sidewall 12 will heat up. The inside sidewall may be constructed from any readily available low cost material such as wood or laminates. The upright supporting elements 16 preferably are corrosion resistance treated poles thereby permitting the outside sidewall 12, inside sidewall 14, and the roof 18 to be formed in accordance with typical low cost building construction techniques. The outside sidewall 12 and the inside sidewall 14 forms a solar plenum 26 therebetween.

The roof 18 may be constructed from readily available low cost materials such as wood of the type used for the inside sidewalls 14. The air pervious floor 24 may be constructed from readily available materials such as metal or wood, with the only criteria being its ability to permit air to pass through while still providing adequate support to hold shelled grain. The air pervious floor 24 generally is spaced above a ground support base 28, as illustrated in FIGS. 2, 5 and 6. The space between the air pervious floor 24, the inside sidewalls 14 and the ground support 28 forms a lower plenum chamber 30.

The solar plenum 26 is essentially air-tight, and is in communication with the atmospheric air through air intakes 20 and is in communication with the lower plenum chamber 30 through the air circulating device 22 beneath the air pervious floor 24.

The air circulating device 22 in the preferred embodiment includes two types: a wind powered turbine 32 mounted on top of the roof, as illustrated in FIG. 9; and an electrically powered fan unit 34 positioned underneath the floor 24 and in communication with both the solar plenum 26 and the lower plenum chamber 30. The wind powered turbine 32 is rotated by the force that atmospheric winds exert on it. As it rotates, it pulls air out of the grain bin 10. The electric fan 34, as noted above, is positioned adjacent to the lower plenum chamber 30; and, when operating, forces air into the lower plenum chamber 30, through the air pervious floor 24, and up through the grain that is stored in the bin 10. When either of the air circulating devices 22 are operating, the outside ambient air enters the bin 10 through the air intakes 20; and, under normal conditions with the sun shining on the outside wall 12, will be heated as heat is absorbed by the sidewall 12. The airflow continues, as is illustrated in FIGS. 2, 3, 5, 6 and 7, downward towards the electric fan device 34 and upwards through the air pervious floor 24, the grain stored within the grain bin 10, and out through the wind powered turbines 32 mounted on the roof 18.

In some instances it may be desirable to maintain air circulation through the stored grain. As is illustrated in FIGS. 7 and 8, the air intakes 20 are fitted with a pair of manually controlled louvers 36 which serve to control the amount of air entering the air intakes 20. Further, fan dampers 48 are disposed within a shroud housing 46 to prevent or allow air flow between the solar plenum 26 and the lower plenum chamber 30. The fan dampers 48 are conventional damper mechanisms and could be of the type described in Patent Application Ser. No. 642,577, now U.S. Pat. No. 4,045,878. With the louvers 36 in the open position, as illustrated in FIG. 7, the air is free to enter through the air intakes 20. However, with the louvers 36 in a closed position, as illustrated in FIG. 8, air will no longer be able to enter the air intakes 20 and the circulation through the stored grain will be prevented. Further, the amount of air entering the bin 10 can be controlled by increasing or decreasing the opening of the louvers 36.

The inside sidewall 14, in cooperation with the air pervious floor 24, forms a grain chamber 38 within which the grain is stored. As is illustrated in FIGS. 2 and 6, the inside sidewall 14 is beveled at one of the corners and provides a surface on which a ladder 40 is secured. Also, the outside sidewall 12 adjacent to the location of the ladder 40 contains a doorway 42 which will permit a person to enter through the outside sidewall 12 into a space between the outside sidewall 12 and the inside sidewall 14 thus permitting the individual to move up the ladder 40 and to view the grain chamber 38 through an inspection door 44 as illustrated in FIG. 6. The remaining portion of the inside sidewall above the inspection door 44 forms an airtight seal with the roof 18. This section, while in the preferred embodiment is in communication with the roof 18, may also be positioned in contact with the outside sidewall 12, since its main function is to form a seal and prevent the air entering the solar plenum 26 from passing immediately up to the wind powered turbine 32 without first passing through the solar plenum 26 and the grain.

The electric fan assembly 34 is positioned, as stated previously, below the air pervious floor 24 in a shroud housing 46. The electric fan assembly 34 is disposed inside the outside sidewall 12 thereby removing it from exposure to weather. Access doors 50 are disposed within the outside sidewall 12 and provide access to electric fan assembly 34. The main purpose of the shroud is to position the fan 34, out of the lower plenum chamber 30, to thereby provide access to the fan and permit the fan 34 to create a high pressure area in the lower plenum chamber 30. The shroud 46 also reduces air turbulences, thereby permitting smooth and even air flow through the air pervious floor 24.

An angled section 54 of the air pervious floor 24 is disposed above the electric fan assembly 34, as most clearly shown in FIG. 5. The angled section 54 is disposed above the corner of the inside sidewall 14 such that the air flow to the grain in contact with the angled section 54 is enhanced. The angled section 54 also provides self-cleaning of the grain bin when a conventional bin-sweep in employed.

Although not shown in the drawings, it is understood that infrared lamps can be located in either the solar plenum 26 or the lower plenum chamber 30 for the purpose of purifying and dehumidifying the air. Further, closable vents could be disposed within the inside sidewall 14 and roof dampers could be disposed over the roof openings 17 to provide a structure capable of providing internal circulation of air without drawing atmospheric air into the system.

Thus, as may be readily seen, the grain bin 10 of the invention, fully utilizes inexpensive materials and techniques in its construction. Further, with wind turbines 32 on the roof 18, it is conceivable that under many circumstances, solar heat and surface winds alone will effectively control the condition of the grain stored within the grain bin 10.

Obviously, many modifications and variations of the present invention are possible in light of the above teachings. It is therefore to be understood that, within the scope of the appended claims, the invention may be practiced otherwise than as specifically described.

I claim:

1. A grain storage structure for utilizing solar energy for heating air and surface winds for circulating heated air through stored grain, said structure comprising:
   a base floor;
   outside sidewalls constructed of heat absorbing material extending upwardly around the periphery of said base floor, said outside sidewalls forming a first closed structure and including a plurality of air intakes for permitting ambient air to pass through said sidewalls;
   controllable louver means positioned over said air intakes for selectively allowing or preventing the flow of ambient air through said sidewalls;
   a roof disposed on top of said first closed structure, said roof having openings therein;
   inside sidewalls forming a second closed structure and disposed inwardly of said outside sidewalls, thereby forming a solar plenum between said outside sidewalls and said inside sidewalls;

means for sealing an upper portion of said inside sidewalls with respect to said outside sidewalls;

an air pervious floor disposed above said base floor and within said second closed structure, thereby forming a lower plenum between said base floor and said air pervious floor;

a grain storage chamber formed by said inside sidewalls and said air pervious floor;

means for operably connecting said solar plenum to said lower plenum, whereby air from said solar plenum may enter said lower plenum;

fan means, disposed within said connecting means and disposed between said solar plenum and said lower plenum, for forcing air into said lower plenum and through said grain storage chamber;

controllable damper means positioned within said connecting means for selectively allowing and preventing the flow of air from said solar plenum to said grain storage chamber; and at least one wind powered turbine disposed over an opening in said roof in communication with said grain storage chamber.

* * * * *